United States Patent [19]

Volpe

[11] 4,373,245

[45] Feb. 15, 1983

[54] PROCESS FOR MANUFACTURING A METAL SEAT BACK STRUCTURE

[76] Inventor: Filippo Volpe, Corso Sebastopoli 235, 10100 Torino, Italy

[21] Appl. No.: 194,825

[22] Filed: Oct. 7, 1980

[30] Foreign Application Priority Data

Oct. 10, 1979 [IT] Italy .................. 68967 A/79

[51] Int. Cl.³ .................................... B23P 17/00
[52] U.S. Cl. ............................................ 29/416
[58] Field of Search ............. 29/412, 416; 113/116 F, 113/116 HA, 116 V, 116 Y, 116 BB; 297/443, 452

[56] References Cited

U.S. PATENT DOCUMENTS 2,440,470  4/1948  Greitzer .................. 297/452 X
2,550,479  4/1951  Hoven ....................... 297/452
3,792,522  2/1974  Gray et al. ............. 113/116 HA

FOREIGN PATENT DOCUMENTS 728580  11/1942  Fed. Rep. of Germany ........ 29/416
1196078  5/1959  France ............................. 297/452
511801  2/1939  United Kingdom ............... 297/452

Primary Examiner—Ervin M. Combs
Attorney, Agent, or Firm—Frost & Jacobs

[57] ABSTRACT

L-shaped blanks of flat plate are formed by shearing, the ends of the smaller branches of two L-shaped blanks are collinearly joined together in an end-to-end fashion by electrical welding between rollers to obtain a complete U-shaped blank which is then drawn to a C-shaped cross-section.

5 Claims, 6 Drawing Figures

Fig.1
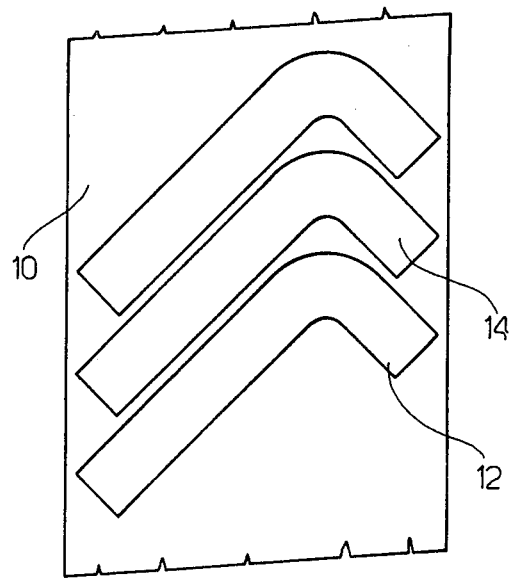
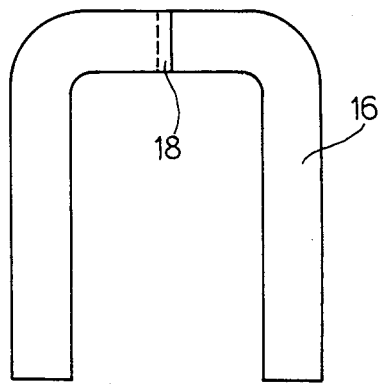
Fig.2

PROCESS FOR MANUFACTURING A METAL SEAT BACK STRUCTURE

BACKGROUND OF THE INVENTION

The present invention relates to a process for manufacturing structures for seat backs of motor vehicles and the like, and to the structure obtained by the said process.

At present time, seats of economical type for motor vehicles and the like are manufactured starting generally from metal tubes which are curved and connected to each other to form tubular structures to which accessory elements, such as flanges, stiffening crosspieces and the like are connected.

The use of tubular structures has been suggested in view of high from drag of such cross-section, but the working of tubular elements is difficult and expensive, inasmuch as it requires sophisticated equipment and sophisticated contrivances for providing the structure with auxialiar elements, such as stiffening crosspieces, hooks, connection flanges, etc. In particular, elements, such as holes or ancohorage hooks for springs, nets, locking devices etc., must necessarily be welded or applied in another way, since they cannot be formed directly from the material of the tube because it is practically impossible to work the tube without deforming it.

SUMMARY OF THE INVENTION

It is an object of the present invention to provide a process for manufacturing structures for seat backs of the type specified hereinabove, which process will allow obtaining a surtcuture comparable to the known tubular structures as regards the sturdiness and the functionality, but with substantially reduced total costs with respect to those involved in the manufacture of tubular structures.

In particular, it is an object of the present invention to provide a structure and a process for its manufacture, in which the necessity of applying accessory elements by welding will be drastically reduced.

These and other objects and advantages of the present invention will become apparent from the following detailed description and are attained by means of a process for manufacturing a metal structure for a seat back for motor vehicles and the like; the said process being characterized in comprising the following steps:

(a) shearing at least two flat L-shaped elements of plate, starting from a sheet material, the width of each branch of the L-shaped element being substantially constant;

(b) welding in an end-to-end abutting fashion the two L-shaped elements opposed to one another with their smaller branches to obtain a single U-shaped blank;

(c) drawing the U-shaped blank to confere to it a C-shaped cross-section along its entire length, thus obtaining a structure usable as a frame of the back of a seat of motor vehicles and the like.

The present invention realtes also to the structure or frame obtained by the said process.

BRIEF DESCRIPTION OF THE DRAWINGS a preferred embodiment of the present invention will now be described in detail, by way of non limiting example, with reference to the accompanying drawings, in which:

FIG. 1 is a plan view of a band of plate, showing the contours of some sheared elements, in order to illustrate a first step of the process according to the present invention;

FIG. 2 is a front view of a blank used as an intermediate element for the obtainment of the structure according to the present invention;

DETAILED DESCRIPTION OF THE INVENTION

Figure 3:
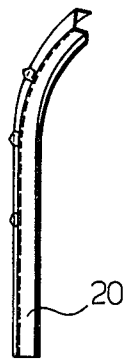
FIG. 3 is a perspective view of a portion of the structure according to the present invention.

Referring now to FIG. 1, in a first step of the process according to the present invention, a plurality of L-shaped elements 12, 14, . . . are obtained, by shearing, from a band of plate 10, the thickness of the plate, the length of each branch of the L-shaped element and the transversal width of each L-shaped element 12, 14 being determined in a way which will become apparent later.

If the L-shaped element as shown in FIG. 1 extends in such a manner that each of its sides is inclined 45° with respect to the longitudinal direction of the plate band 10, or, in other terms, the bisectrix of the right angle formed by the two branches of the L-shaped element extends parallel to the said longitudinal direction of the plate band 10, the various L-shaped elements may be nested into each other as shown, thus obtaining the maximum compactness, with resulting minimum swarfs. According to criteria known in the art, the width of the swarf which separates two adjacent L-shaped elements 12, 14 on the band of plate 10 may be, for example, in the order of twice the thickness of the plate.

The shearing operation as described hereinabove may be carried out at a high speed and at low costs be using equipments and automatic procedures known in the art.

The L-shaped elements 12, 14, . . . obtained in the first shearing step are then joined together in an abutting fashion with the short branches of the L-shaped elements as shown in FIG. 2, and are welded to form for each pair a U-shaped element 16 forming a plane blank of the desired structure. Although the welding may be carried out in different ways, it is preferable, according to the present invention, to carry out an electric welding by fusion between pressure rollers, after having superposed by some millimeters the ends of the branches of the plate to be welded, as shown at 18 in FIG. 2. At the end of the electrical welding under pressure between rollers, the thickness of the material in the welding zone will anyway be reduced substantially to that of the simple plate.

Figure 4:
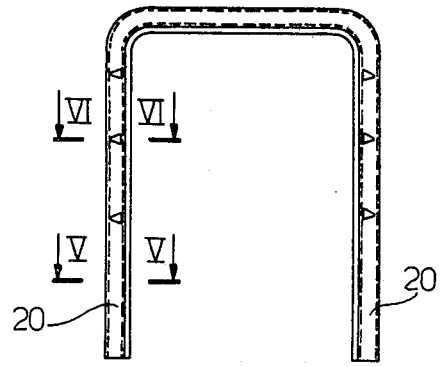
FIG. 4 is a front view of a substantially complete structure according to the invention.
Figure 5:
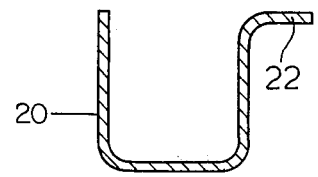

Each U-shaped blank 16 is then subjected to a drawing operation to convert the blank into a C-shaped section 20 of substantially the same general shape of the blank, as shown in FIGS. 3, 4 and 5. Thus, a finished structure is obtained which has the stoutness peculiar to the C-shaped section, though having been obtained starting from a planar plate. Preferably, the transversal contour of the structure has an end flange 22 (FIG. 5) on the inner side, in order the provide a larger bearing surface for the elements which are successively applied during the manufacture of the seat back.

The drawing operation is carried out by conventional forming procedures, a detailed description of which is unnecessary.

Figure 6:
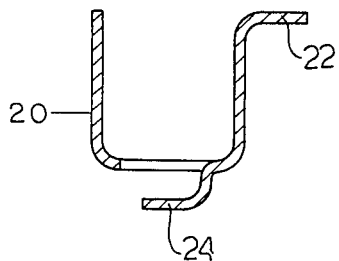
FIGS. 5 and 6 are sections along the lines V—V and VI—VI of FIG. 4.

As an optional final working step, the structure thus obtained may be subjected to further shearing and bending operations to form holes and hooks, as shown for example by the hooks 24 illustrated in FIGS. 3, 4 and 6, for the anchorage of further elements (not shown), such as springs or the like. In this case also, an assembly of hooks and the like is obtained in an economical way and by a single shearing operation, which hooks, in the tubular structures of the prior art, should be applied, for example, by further single welding operations.

Although a preferred embodiment of the present invention has been described, it is clear that this embodiment is susceptible of modifications and variations, without departing from the scope of the inventive idea as defined in the annexed claims.

What I claim is:

1. A process for manufacturing a metal structure for a seat back for motor vehicles and the like, characterized in comprising the following steps:
   (a) shearing at least tow flat L-shaped elements (12, 14) from a sheet metal plate (10), each element having a long and a short branch wherein the width of each branch of the L-shaped elements is substantially constant and the short branches terminate in flat outer marginal ends;
   (b) positioning the outer marginal ends of the short branches of the two L-shaped elements in abutting relationship;
   (c) welding together the abutting marginal ends of the short branches of the two L-shaped elements (12, 14) to obtain a single, planar U-shaped blank (16);
   (d) drawing the U-shaped blank (16) to form a C-shaped cross-section along its entire length, which cross-section opens outwardly relative to the plane of said U-shaped blank, obtaining a structure usable as a frame for the back of a seat of motor vehicles and the like.

2. A process as claimed in claim 1, comprising the further steps of shearing and bending the U-shaped blank to form holes and hooks (24) therein.

3. A process as claimed in claim 1, further comprising step (a) sequentially repeating along a band of in a manner so that, the branches of the L-shaped elements form angles of 45° with respect to the longitudinal direction of the band, in order to obtain the maximum utilization of the band material.

4. A process as claimed in claim 1, wherein said welding is an electric welding by fusion carried out between pressure rollers.

5. A process as claimed in claim 1, comprising a further step of bending an end portion of said C-shaped section outwardly to form a flange on said portion.

* * * * *